United States Patent
Savir et al.

(10) Patent No.: US 12,236,276 B2
(45) Date of Patent: Feb. 25, 2025

(54) EDGE AND CLOUD COMPUTING IMAGE PROCESSING

(71) Applicant: EMC IP Holding Company LLC, Hopkinton, MA (US)

(72) Inventors: Amihai Savir, Newton, MA (US); Oshry Ben-Harush, Cedar Park, TX (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 720 days.

(21) Appl. No.: 17/503,034

(22) Filed: Oct. 15, 2021

(65) Prior Publication Data

US 2023/0122881 A1   Apr. 20, 2023

(51) Int. Cl.
  *G06F 9/50* (2006.01)
  *G06F 11/34* (2006.01)
  *G06N 3/02* (2006.01)

(52) U.S. Cl.
  CPC ............ *G06F 9/5044* (2013.01); *G06F 9/505* (2013.01); *G06F 11/3419* (2013.01); *G06N 3/02* (2013.01)

(58) Field of Classification Search
  CPC .... G06F 9/5044; G06F 9/505; G06F 11/3419; G06F 2209/509; G06N 3/02; G06N 3/098
  See application file for complete search history.

(56) References Cited

U.S. PATENT DOCUMENTS

| | | | | |
|---|---|---|---|---|
| 2019/0037638 | A1* | 1/2019 | Kasaragod | H04L 67/10 |
| 2019/0042878 | A1* | 2/2019 | Sheller | H04L 67/10 |
| 2020/0351380 | A1* | 11/2020 | Fedorov | H04W 4/70 |
| 2021/0014654 | A1* | 1/2021 | Gupta | H04L 67/10 |
| 2022/0343691 | A1* | 10/2022 | Nakachi | G06V 10/774 |
| 2023/0039182 | A1* | 2/2023 | Cheng | G06N 3/098 |

OTHER PUBLICATIONS

"Edge Computing" Dell Israel. [https://www.delltechnologies.com/he-il/solutions/edge-computing/index.htm] retreived Feb. 5, 2024, 9 pages.

Kamenskaya et al. "Some aspects of automated psychological characteristics recognition from the facial image" [https://www.researchgate.net/profile/Kukharev-Georgy/publication/255565371] Metody Informatyki Stosowanej, 2008, 10 pages.

* cited by examiner

*Primary Examiner* — Jorge A Chu Joy-Davila
(74) *Attorney, Agent, or Firm* — Amin, Turocy & Watson, LLP

(57) ABSTRACT

A system can train a neural network model at a first edge device regarding respective amounts of time to process data at the first edge device compared to corresponding amounts of time to process the data at cloud computing equipment that is connected to the first edge device via a communications network, wherein the data is generated at the first edge device. The system can update the neural network model to produce an updated neural network model based on information received from a second edge device regarding a performance of the cloud computing equipment in processing the data, wherein the first edge device and the second edge device having respective different processing capabilities. The system can determine whether to process first data, generated at the first edge device, locally at the first edge device.

20 Claims, 10 Drawing Sheets

600 ↘

TRAIN A NEURAL NETWORK MODEL AT A FIRST EDGE DEVICE REGARDING RESPECTIVE AMOUNTS OF TIME TO PROCESS DATA LOCALLY COMPARED TO AT A CLOUD COMPUTING PLATFORM, WHEREIN THE DATA IS GENERATED AT THE FIRST EDGE DEVICE 604

UPDATE THE NEURAL NETWORK MODEL RESULTING IN AN UPDATED NEURAL NETWORK MODEL BASED ON INFORMATION RECEIVED FROM A SECOND EDGE DEVICE REGARDING A DATA PROCESSING PERFORMANCE OF THE CLOUD COMPUTING PLATFORM 606

IN RESPONSE TO FIRST DATA BEING GENERATED AT THE FIRST EDGE DEVICE, DETERMINE, USING THE UPDATED NEURAL NETWORK MODEL, WHETHER TO TRANSMIT FIRST DATA TO THE CLOUD COMPUTING PLATFORM FOR PROCESSING 608

TRAIN A NEURAL NETWORK MODEL AT AN EDGE DEVICE REGARDING RESPECTIVE AMOUNTS OF TIME TO PROCESS DATA LOCALLY COMPARED TO AMOUNTS OF TIME TO PROCESS THE DATA AT NETWORK EQUIPMENT REMOTE FROM THE EDGE DEVICE, WHEREIN THE DATA IS GENERATED AT THE EDGE DEVICE 704

DETERMINE WHETHER TO PROCESS FIRST DATA, GENERATED AT THE EDGE DEVICE, LOCALLY OR TO TRANSMIT THE FIRST DATA TO THE NETWORK EQUIPMENT FOR PROCESSING 706

PERFORM THE FIRST OPERATION ON THE FIRST EDGE DEVICE INDEPENDENT OF THE DETERMINING WHETHER TO PROCESS THE FIRST DATA LOCALLY 804

↓

DETERMINE WHETHER TO PERFORM THE SECOND OPERATION LOCALLY OR TO TRANSMIT THE FIRST DATA TO THE CLOUD COMPUTING EQUIPMENT FOR PROCESSING 806

EDGE AND CLOUD COMPUTING IMAGE PROCESSING

BACKGROUND

An edge computing architecture can comprise multiple edge devices that gather data (e.g., a video camera that captures video data), as well as a central server. In general, the central server can have more computing resources than a respective edge device.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can train a neural network model at a first edge device regarding respective amounts of time to process data at the first edge device compared to corresponding amounts of time to process the data at cloud computing equipment that is connected to the first edge device via a communications network, wherein the data is generated at the first edge device. The system can update the neural network model to produce an updated neural network model based on information received from a second edge device regarding a performance of the cloud computing equipment in processing the data, wherein the first edge device and the second edge device having respective different processing capabilities, and wherein the neural network model comprises a first neural network model that is trained with a first set of data, wherein the second edge device comprises a second neural network model that is trained with a second set of data, and wherein the first neural network model and the second neural network model differ. The system can determine whether to process first data, generated at the first edge device, locally at the first edge device.

An example method can comprise training, by a system comprising a processor, a neural network model at a first edge device regarding respective amounts of time to process data locally compared to at a cloud computing platform, wherein the data is generated at the first edge device. The method can further comprise updating, by the system, the neural network model resulting in an updated neural network model based on information received from a second edge device regarding a data processing performance of the cloud computing platform. The method can further comprise, in response to first data being generated at the first edge device, determining, by the system and using the updated neural network model, whether to transmit first data to the cloud computing platform for processing.

An example non-transitory computer-readable medium can comprise instructions that, in response to execution, cause a system comprising a processor to perform operations. These operations can comprise training a neural network model at an edge device regarding respective amounts of time to process data locally compared to amounts of time to process the data at network equipment remote from the edge device, wherein the data is generated at the edge device. These operations can further comprise determining whether to process first data, generated at the edge device, locally or to transmit the first data to the network equipment for processing.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 6 illustrates another example process flow that can facilitate edge and cloud computing image processing, in accordance with an embodiment of this disclosure;

FIG. 7 illustrates another example process flow that can facilitate edge and cloud computing image processing, in accordance with an embodiment of this disclosure;

FIG. 8 illustrates another example process flow for subdividing processing between edge and cloud computing that can facilitate edge and cloud computing image processing, in accordance with an embodiment of this disclosure;

DETAILED DESCRIPTION

Overview

Figure 1:
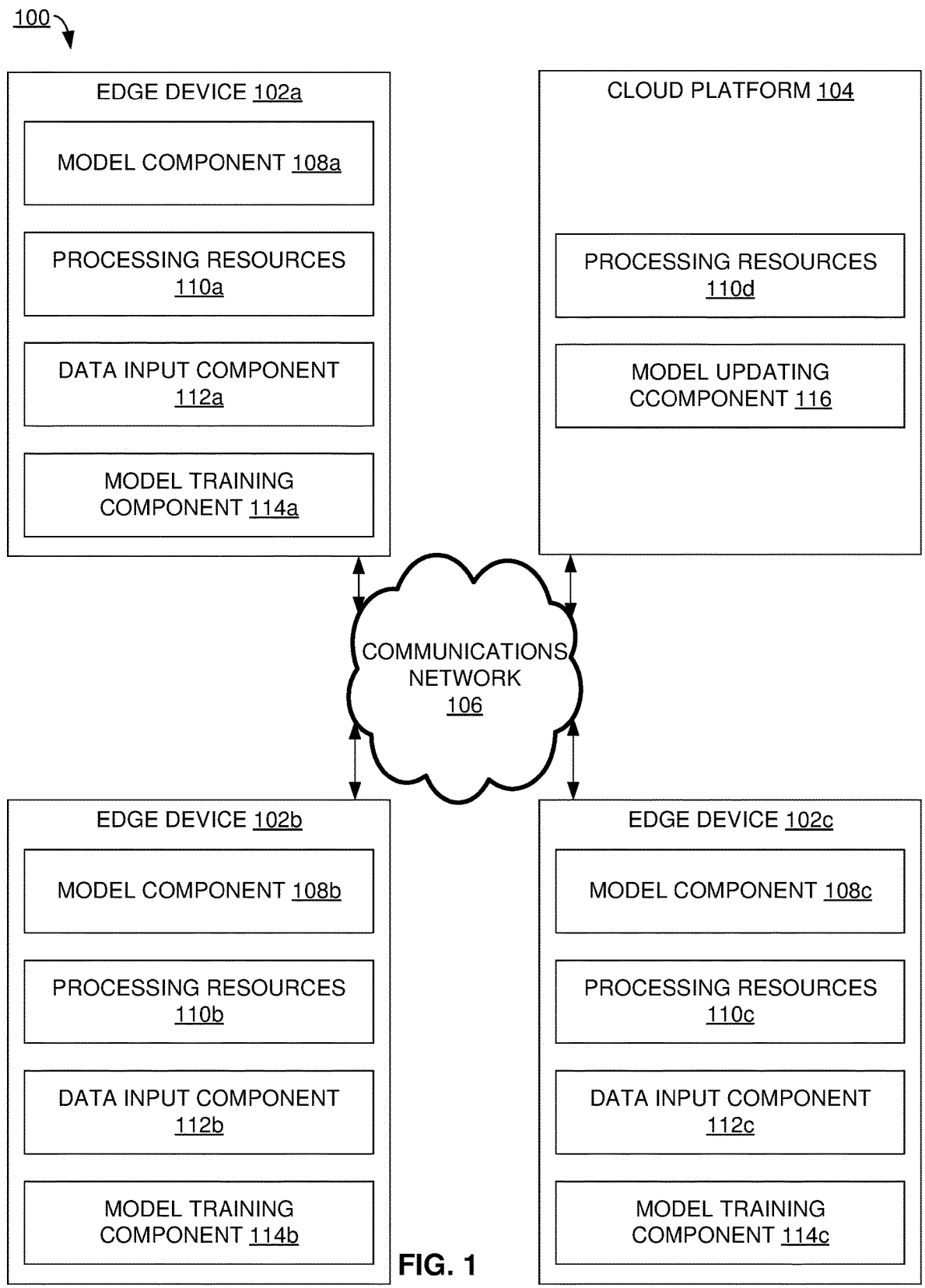
FIG. 1 illustrates an example system architecture that can facilitate edge and cloud computing image processing, in accordance with an embodiment of this disclosure.

There can be a tradeoff between running workloads on cloud computing resources compared to edge computing resources, such as available processing power and latency. In some examples where a required response time is not very short or an amount of calculation required is extensively high, it can be clear that a given type of calculation should be performed on the cloud instead of the edge. However, in some examples, there can be a preference to running workloads on the edge to reduce networking bottlenecks and to distribute computation usage across edge nodes.

With respect to image processing systems, deciding whether to perform certain processing on the edge or on the cloud can vary according to specifics of a given image (e.g., a number of details in the image, or a number of areas of interest in the image). In some examples, a relatively high complexity of processing associated with an image can indicate that cloud processing is preferable to edge processing. In other examples, a relatively simple image to process can indicate that edge processing is preferable to cloud processing.

The present techniques can be implemented to improve runtime analysis of where to process an image by quickly and efficiently assessing a complexity of the image (e.g., by using artificial intelligence estimation techniques), and based on that assessment, determining where to process the image. A benefit of implementing the present techniques can be to provide a holistic solution that efficiently utilizes available computing resources.

In some examples, an estimation of the time it takes (e.g., computation complexity) for complicated inference tasks can be difficult to obtain. For example, when there are many faces in the image, conducting face recognition for that image can take significantly more time than compared to an image with a few faces. Without a proper estimation of the complexity of an image, there can little room for planning and scheduling image processing tasks.

Making a decision on an optimal, or chosen, configuration to accomplish a given calculation can be difficult, because an amount of time it takes to run the same abstract task can vary according to the input complexity. The input complexity can be different from the size of the image input. That is, two images with a same size can have different attributes and visual details that affect a complexity of processing the respective images.

At times, to meet service level agreement (SLA) requirements, it can be more efficient to communicate the image to a cloud instance, process the image, and return results to the edge, or pass over the subsequent systems.

In some examples, workloads can execute on the edge. Randomly, and as part of training, workloads can be replicated to a cloud instance as well, and an inference output can be made, as well as monitored metrics can be tracked (in some examples, the inference output produced by the cloud in training can be ignored). Following training, an estimation model can make decisions of where to perform image inference processing based on the image and the provided constraints. These techniques can be further optimized by running a test data set on the cloud and on the edge, gathering the respective metrics (e.g., processing time and network latency), and training the estimation model based on these gathered metrics.

The present techniques can be implemented to provide an estimation of image inference complexity. This estimation can be used for both planning and scheduling purposes.

The present techniques can also be implemented to balance image inference on the cloud and on the edge. That is, a decision of whether to perform an inference task on the cloud or on the edge can be made based on a measured complexity of the image. The present techniques can also be implemented to automate balancing cloud and edge. That is, a decision for a tradeoff between cloud and edge can be automatically made per image, for inference and recognition tasks.

The present techniques can be implemented to automatically balance inference for image processing systems deployed using a cloud-edge architecture. These techniques can include a learning component that makes a decision on routing to the cloud or keeping the task on the edge in order to meet performance constraints, obtain a service level, and optimize available resources.

In some examples, a cloud platform can train a model over many historical cases (where historical cases can be runs performed on an edge device, as well as on a cloud platform), and the model can be frequently updated offline (e.g., the cloud platform can update the model that is used by an edge device when the cloud platform is not currently communicating with the edge device about updating the model). A cloud platform can send a pre-trained model (along with its parameters) to an edge device, and the edge device can utilize this pre-trained model to run an inference (e.g., estimate) of processing speed according to edge parameters and a given workload (e.g., the model can process the parameters).

Example Architectures

FIG. 1 illustrates an example system architecture 100 that can facilitate edge and cloud computing image processing, in accordance with an embodiment of this disclosure. System architecture comprises edge device 102a, edge device 102b, edge device 102c, cloud platform 104, and communications network 106.

Edge device 102a comprises model component 108a, processing resources 110a, data input component 112a, and model training component 114a. Edge device 102b comprises model component 108b, processing resources 110b, data input component 112b, and model training component 114b. Edge device 102c comprises model component 108c, processing resources 110c, data input component 112c, and model training component 114c. Cloud platform 104 comprises processing resources 110d and model updating component 116.

Figure 10:
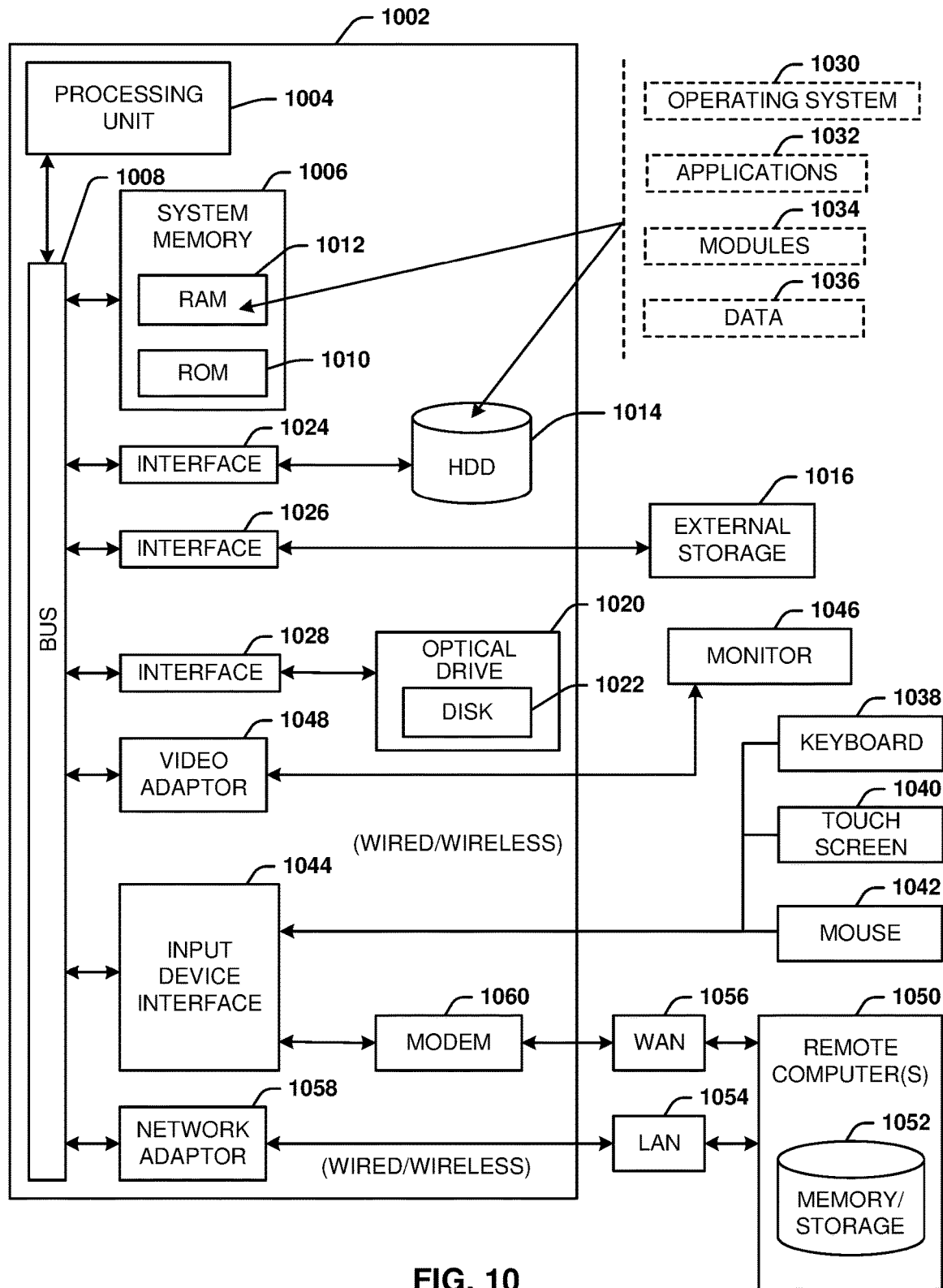
FIG. 10 illustrates an example block diagram of a computer operable to execute an embodiment of this disclosure.

Each of edge device 102a, edge device 102b, edge device 102c, and cloud platform 104 can be implemented with part(s) of computing environment 1000 of FIG. 10.

Each of edge device 102a, edge device 102b, edge device 102c can comprise an edge computing device. An edge computing device can be so named because it is located at the edge of a network, where the device gathers data with sensors (such as images or video). Cloud platform 104 can provide access to computing resources for each of edge device 102a, edge device 102b, edge device 102c. For instance, edge device 102a can capture an image and then transfer the image to cloud platform 104 via communications network 106 to storage or processing. In some examples, cloud platform 104 can provide more computing resources (e.g., faster processing, or more storage) than edge device 102a, and those resources can be consumed, so that an amount of available resources can be lower than that of edge device 102a.

Communications network 106 can comprise a computer communications network, such as the INTERNET.

Each of model component 108a, model component 108b, and model component 108c can comprise a trained neural network model that takes an input (such as a video) and determines whether to perform a function on that input using the respective edge device upon which the model component operates, or on cloud platform 104.

For instance, a model component can determine where to process an input based on whether it is faster to process it locally (on an edge device with relatively fewer processing resources, so the act of processing can be slower compared to a cloud platform) or in the cloud (where there can be relatively more processing resources, so the act of processing can be faster compared to on an edge device; though, there is a latency associated with transferring the image across a network, which can make the cloud an overall slower option).

In some examples, a neural network component can also consider constraints on the processing, such as a service level agreement, a cost of computation on the cloud, an amount of network congestion, an amount of cloud congestion, and a time of day.

In some examples, each of model component 108a, model component 108b, and model component 108c can be different (e.g., each model can have different weights) to reflect the circumstances of each respective edge device (e.g., some edge devices can have more processing resources relative to others, a faster connection to cloud platform relative to others, or different constraints relative to others).

Each of processing resources 110a, processing resources 110b, processing resources 110c, and processing resources 110d can comprise computer processing resources (such as provided by a microprocessor) that can be utilized to perform processing on input data, such as an image. Processing resources 110a, processing resources 110b, processing resources 110c, and processing resources 110d can be different. For example, edge device 102a can be more powerful than edge device 102b. Or cloud platform 104 can have special hardware for performing a particular processing task that makes it faster to perform that task relative to an edge device.

Each of data input component 112a, data input component 112b, and data input component 112c can comprise a sensor to generate input data, such as a camera to capture images or video, or a microphone to capture audio.

Model training component 114a, model training component 114b, and model training component 114c can each train and update model component 108a, model component 108b, and model component 108c, respectively. A model training component can use metrics gathered on the edge device (e.g., how much time it takes to process a particular input on the edge device), as well as metrics for the cloud received from model updating component 116 (e.g., how much time it takes to process a particular input on cloud platform 104) and use this information to train a respective model component in determining where to process a particular input data-either on the edge device itself or on cloud platform 104.

Model updating component 116 can gather metrics relating to processing data on cloud platform 104 (e.g., how long it takes to process particular data), and share this with one or more model training components, which can use this data to update their respective model component.

As described with respect to system architecture 100, there can generally be two stages to processing an input. One stage can be performed at an edge device, where the input is analyzed to determine where to perform additional processing-either on the edge device itself or on cloud platform 104. Once that determination is made, a second stage of processing can occur at the determined location (cloud or edge). This second stage can comprise, e.g., performing facial recognition on an image or determining whether an intruder is detected in an image from a security system.

Figure 5:
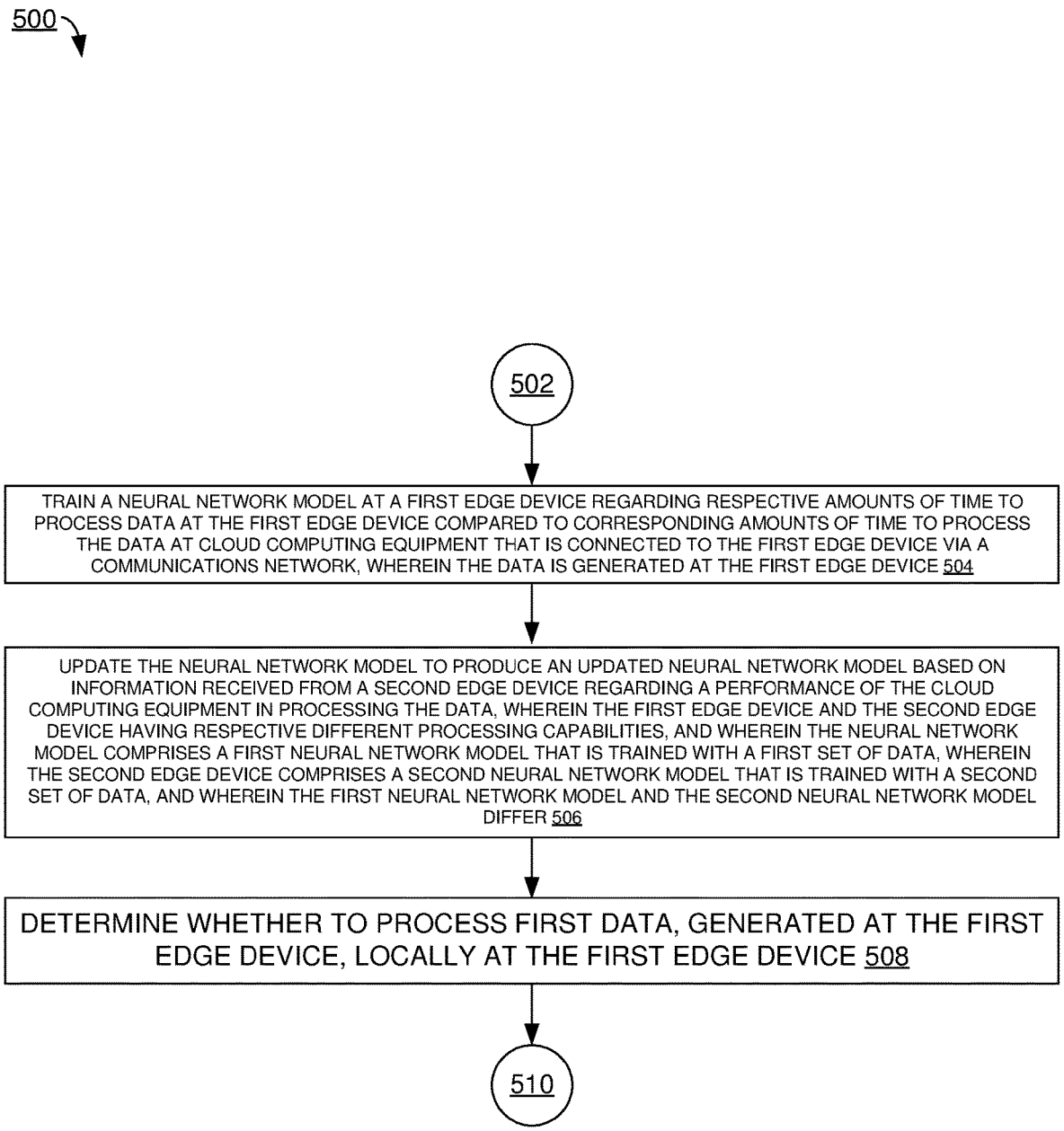
FIG. 5 illustrates an example process flow that can facilitate edge and cloud computing image processing, in accordance with an embodiment of this disclosure.
Figure 9:
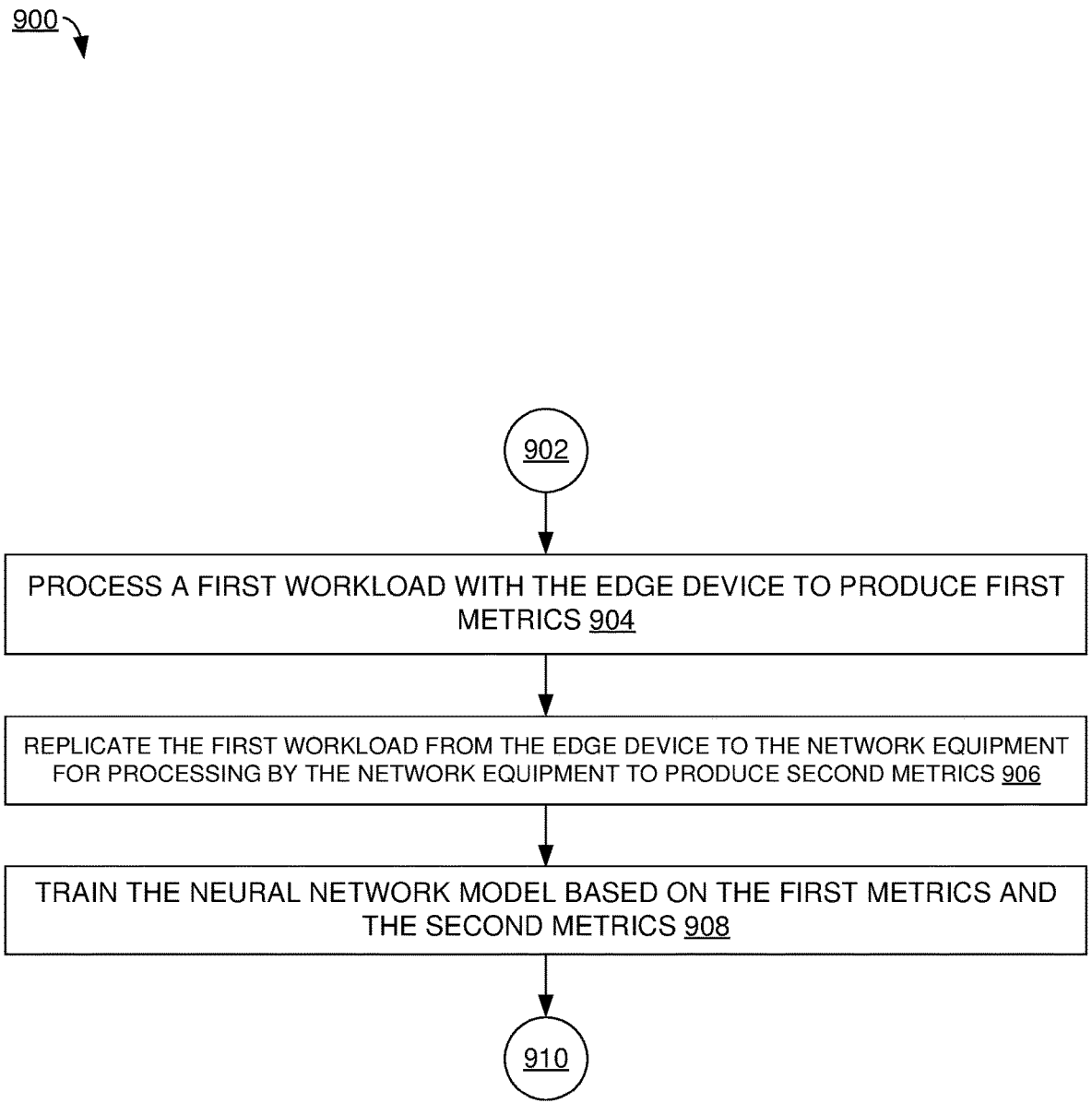
FIG. 9 illustrates another example process flow for training a model that can facilitate edge and cloud computing image processing, in accordance with an embodiment of this disclosure.

In the course of facilitating edge and cloud computing image processing, system architecture and/or edge device 102a, edge device 102b, and/or edge device 102c can implement part(s) of process flow 500 of FIG. 5, process flow 600 of FIG. 6, process flow 700 of FIG. 7, process flow 800 of FIG. 8, and/or process flow 900 of FIG. 9.

Figure 2:
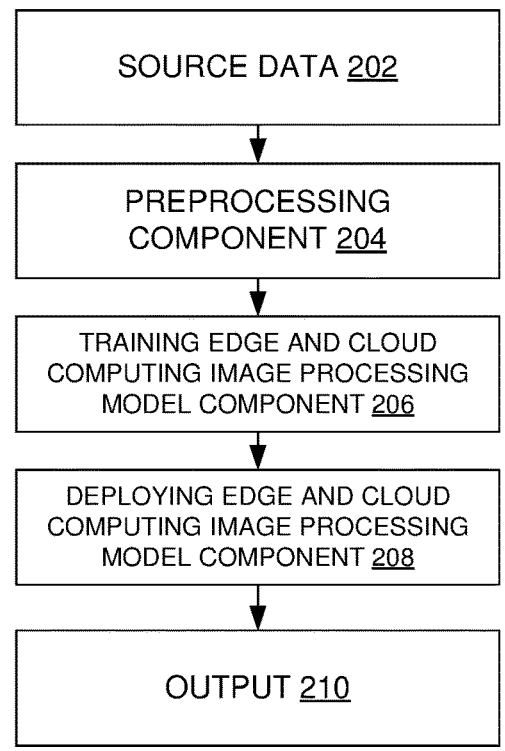
FIG. 2 illustrates another example system architecture that can facilitate edge and cloud computing image processing, in accordance with an embodiment of this disclosure.

FIG. 2 illustrates another example system architecture 200 that can facilitate edge and cloud computing image processing, in accordance with an embodiment of this disclosure. System architecture 200 comprises source data 202, preprocessing component 204, training edge and cloud computing image processing model component 206, deploying edge and cloud computing image processing model component 208, and output 210.

In some examples, part(s) of system architecture 200 can be used to implement part(s) of edge device 102a, edge device 102, and/or edge device 102c of FIG. 1. In some examples, system architecture 200 can be implemented with part(s) of computing environment 1000 of FIG. 10.

Source data 202 can comprise data that is analyzed to determine where to process the image (e.g., on edge or cloud), and then processed (e.g., to identify whether an intruder is present in an image for a security system). Source data 202 can be a dataset used for training an edge and cloud computing image processing model.

Preprocessing component 204 can perform preprocessing tasks, such as cleaning, clipping, labeling, and normalizing source data 202. Training edge and cloud computing image processing model component 206 can use this preprocessed data from preprocessing component 204, and use it to train an edge and cloud computing image processing model to take input data (and in some examples, associated constraints) and produce an output that indicates whether to perform further processing on the input data locally or in the cloud.

Deploying edge and cloud computing image processing model component 208 can comprise a deployed version of the model trained by training edge and cloud computing image processing model component 206. Deploying edge and cloud computing image processing model component 208 can receive an input data and produce an output that indicates whether to perform further processing on the input data locally or in the cloud. This output can be output 210.

In some examples, machine learning and AI-based image processing systems can comprise two main stages. One stage can be model training (e.g., training edge and cloud computing image processing model component 206), where parameters of a model (such as a machine learning model or an AI model) can be optimized for a specific data set or use case. Another stage can be model inference, where a trained (e.g., optimized) model (e.g., in deploying edge and cloud computing image processing model component 208) can be used to produce an outcome for a given image (e.g., where that outcome is an identification of whether to further process the image on edge or on cloud).

Take an example security system, where an objective of the security system is to identify faces in a given image and associate those faces with a database of known individuals. Developing such a system can involve developing an AI system that identifies the presence of faces in an image. Then, a subsequent task can be to run these faces through a face recognition system, which can be a more computationally-expensive task as it can involve extracting features, comparing those extracted features to a database of known individuals, and returning information of whether a known individual is identified in the image.

Figure 3:
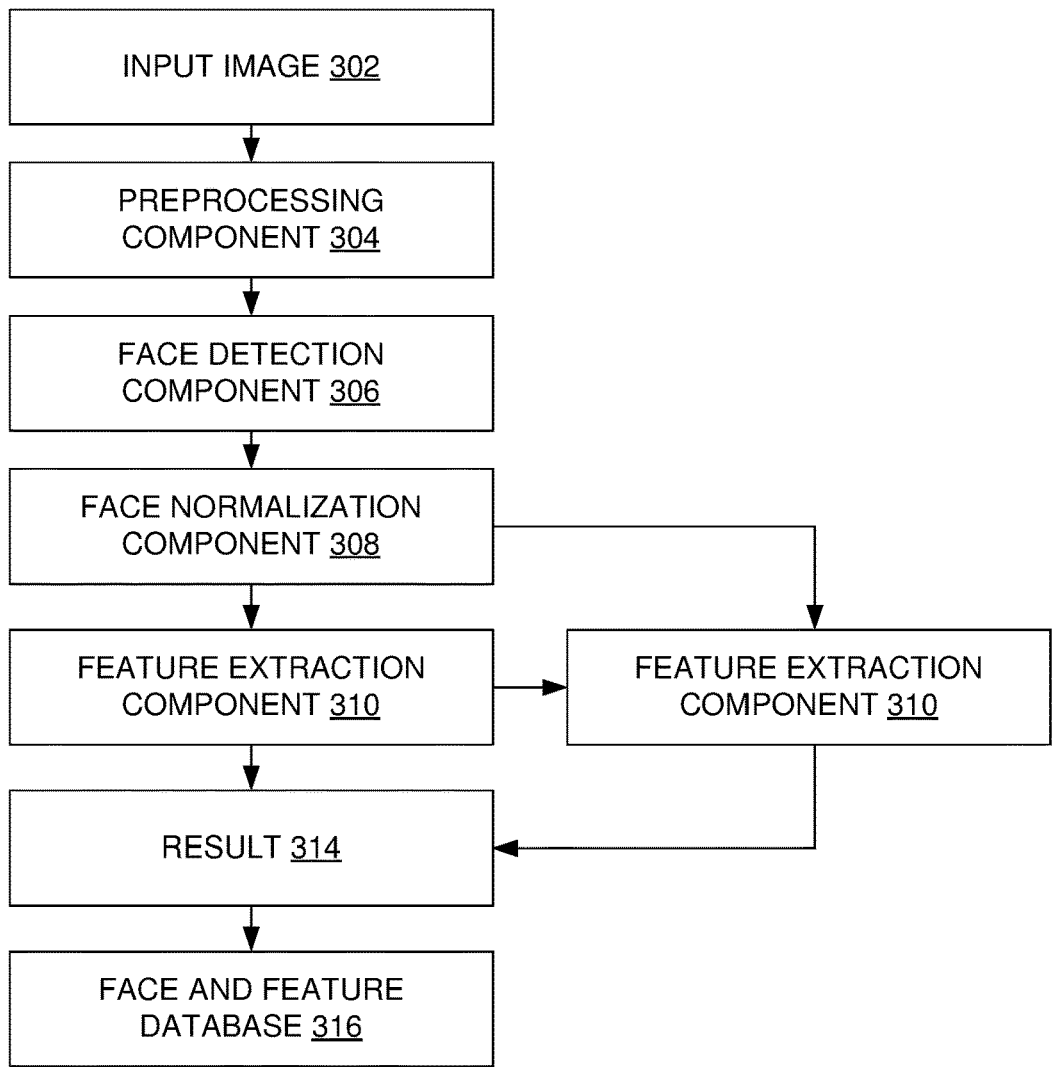
FIG. 3 illustrates another example system architecture that can facilitate edge and cloud computing image processing, in accordance with an embodiment of this disclosure.

FIG. 3 illustrates another example system architecture 300 that can facilitate edge and cloud computing image processing, in accordance with an embodiment of this disclosure. System architecture 300 comprises input image 302, preprocessing component 304, face detection component 306, face normalization component 308, feature extraction component 310, comparator component 312, result 314, and face and feature database 316.

In some examples, part(s) of system architecture 300 can be used to implement part(s) of edge device 102a, edge device 102, edge device 102c, and/or cloud platform 104 of FIG. 1. In some examples, system architecture 300 can be implemented with part(s) of computing environment 1000 of FIG. 10.

Input image 302 can be a computer image for which processing is to be performed. Preprocessing component 304 can be similar to preprocessing component 204 of FIG.

2. Face detection component 306 can identify one or more faces within the image after it has been preprocessed with preprocessing component 304. Face normalization component 308 can normalize an image of a face detected by face detection component 306. Face normalization can comprise adjusting images so that they are similar—for example, so each face within an image is approximately the same size.

Feature extraction component 310 can extract features from the image produced from face normalization component 308. The output of both face normalization component 308 and feature extraction component 310 can be sent to face and feature database 316, where both can be stored along with an association between the two types of data.

Comparator component can use the output of feature extraction component 310 and information in face and feature database 316 to determine if a face in input image 302 is identifiable based on information in face and feature database 316. A result of this determination can be produced as result 314.

In some examples, model development can be performed offline, using powerful computation systems over a period of time that is dedicated for a development process, and can involve continuous research and development using standard data sets collected and used throughout a development process. In some examples, data can be adjusted and expanded, and the computation environments used to run the model can vary, while overall this model development can be performed without considering constraints enforced during the deployment stage (while in some examples, development can be specifically done to address the constraints introduced by a production environment). That is, a model can be developed without consideration as to whether it will be deployed on the cloud (with relatively higher computing capabilities) or on the edge (with relatively lower computing capabilities).

In some examples, computing resources used to develop a model can resemble a powerful cloud infrastructure, and can include dedicated deep learning and AI processing units that can be deployed as part of a cloud instance.

Deployment of face detection and recognition systems can be an evolved process. Reasons for this can include that video cameras are deployed in different remote locations; that response time can be extremely important, especially for security systems; and that an amount of data generated can be massive and lead to a bottleneck on a central compute system and on a network that at times might be clogged and/or remote.

For these and other reasons, such as an increase of computation power on Internet of Things (IoT) and edge compute devices, deployments of such systems can utilize a hub-and-spoke, or cloud-and-edge architecture.

Figure 4:
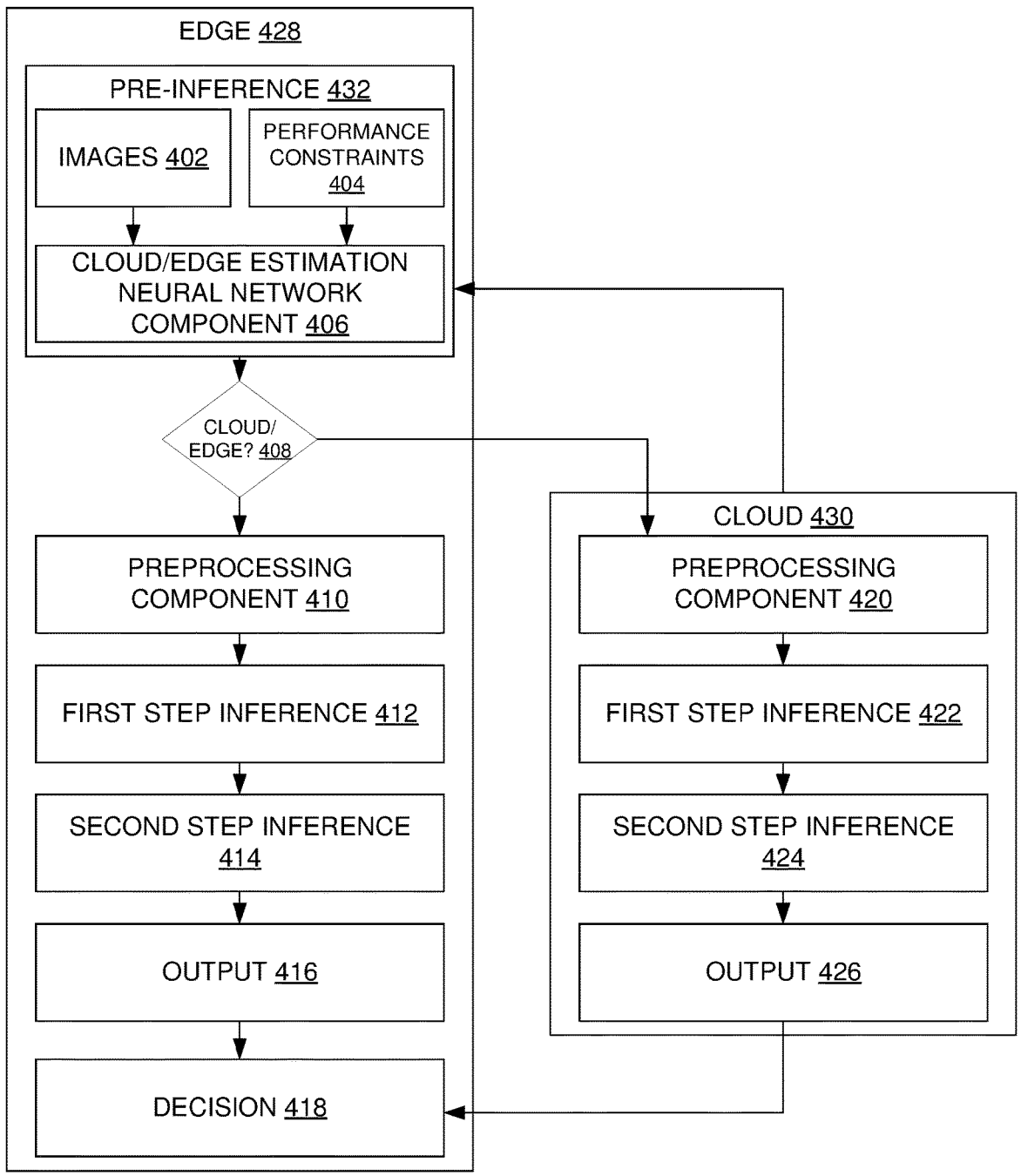
FIG. 4 illustrates another example system architecture that can facilitate edge and cloud computing image processing, in accordance with an embodiment of this disclosure.

FIG. 4 illustrates another example system architecture 400 that can facilitate edge and cloud computing image processing, in accordance with an embodiment of this disclosure. System architecture 400 comprises edge 428 (which can be similar to edge device 102a of FIG. 1) and cloud (which can be similar to cloud platform 104 of FIG. 1). In turn, edge 428 comprises pre-inference 432 (which comprises images 402, performance constraints 404, and cloud/edge estimation neural network component 406), cloud/edge? 408, preprocessing component 410, first step inference 412, second step inference 414, output 416, and decision 418. Cloud 430 comprises preprocessing component 420, first step inference 422, second step inference 424, and output 426.

In some examples, part(s) of system architecture 300 can be used to implement part(s) of system architecture 100 of FIG. 1. In some examples, system architecture 400 can be implemented with part(s) of computing environment 1000 of FIG. 10.

Images 402 can comprise images captured by edge 428 that are to be processed, where edge 428 will determine whether to process the images on edge 428 or cloud 430. Performance constraints 404 can comprise constraints on how images 402 are to be processed (e.g., a corresponding SLA). Cloud/edge estimation neural network component 406 can determine, based on images 402, performance constraints 404, metrics received from cloud 430 on how cloud 430 processes images, and metrics received from output 416 on how edge 428 processes images, whether to process each of images 402 locally or on cloud 430.

Cloud/edge? 408 can route a particular image to cloud 430 or for local processing based on a determination of cloud/edge estimation neural network component 406. Preprocessing component 410, first step inference 412, and second step inference 414 can comprise stages of processing an image on edge 428, and a result of this processing can be output 416.

Similarly, preprocessing component 420, first step inference 422, and second step inference 424 can comprise stages of processing an image on cloud 430, and a result of this processing can be output 426. Decision 418 can comprise a decision of processing an image of images 402, such as whether an intruder is detected in the image from a security system, and can be made based on output 426 of cloud 430 or output 416 of edge 428, depending on where the image was processed.

The present techniques can be implemented to apply a smaller neural network (relative to prior approaches) that, over time, learns to estimate the amount of processing time required for applying inference on each of the cloud and the edge given the image as input. This network can use underlying principles of a deep neural network for identifying relevant features that contribute to increased levels of complexity and calculation required for inference (which can use transfer learning and/or auto-encoding networks).

Once a model according to the present techniques is trained and designed, generating an estimate from the model can require few resources, and the model can generally improve in accuracy over time. Using these estimations of a complexity of an image, together with an optional required service level and response time, can facilitate optimizing an image processing system's performance, and meet target metrics.

An estimation network can comprise a small, efficient network that decides whether to conduct an image inference on the edge or on the cloud, given a specific input image and a set of constraints. These constraints can include a SLA, a cost of computation on the edge and in the cloud, an amount of network congestion, an amount of cloud congestion, and an hour of the day.

In some deep learning machine learning examples, feature engineering can be omitted as a model can learn features on its own during a training process. In these examples, a model's role can be to identify types of patterns in an image that can impact inference duration and computational complexity (e.g., quickly identify how many faces are present in an image for a face recognition system, or identifying a number of different pixels in an intrusion detection system). The model can then incorporate constraints given and produce a recommendation to run a workload on the cloud or keep it running on the edge.

Example Process Flows

FIG. 5 illustrates an example process flow 500 that can facilitate edge and cloud computing image processing, in accordance with an embodiment of this disclosure. In some examples, one or more embodiments of process flow 500 can be implemented by edge device 102*a* of FIG. 1, or computing environment 1000 of FIG. 10.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 600 of FIG. 6, process flow 700 of FIG. 7, process flow 800 of FIG. 8, and/or process flow 900 of FIG. 9.

Process flow 500 begins with 502, and moves to operation 504.

Operation 504 depicts training a neural network model at a first edge device regarding respective amounts of time to process data at the first edge device compared to corresponding amounts of time to process the data at cloud computing equipment that is connected to the first edge device via a communications network, wherein the data is generated at the first edge device. That is, a neural network on an edge device (e.g., edge device 102*a* of FIG. 1) can be trained (similar to training edge and cloud computing image processing model component 206 of FIG. 2) to determine whether to process input data locally or on a cloud platform (e.g., cloud platform 104 of FIG. 1). A trained neural network model can be similar to cloud/edge estimation neural network component 406 of FIG. 4. After operation 504, process flow 500 moves to operation 506.

Operation 506 depicts updating the neural network model to produce an updated neural network model based on information received from a second edge device regarding a performance of the cloud computing equipment in processing the data, wherein the first edge device and the second edge device having respective different processing capabilities, and wherein the neural network model comprises a first neural network model that is trained with a first set of data, wherein the second edge device comprises a second neural network model that is trained with a second set of data, and wherein the first neural network model and the second neural network model differ.

That is, an edge device can update its model (regarding cloud platform performance) based on information received from another edge device. For example, using system architecture 100 of FIG. 1, edge device 102*a* can update model component 108*a* based on information about processing by cloud platform 104 received from edge device 102*b* or edge device 102*c*.

In some examples, first edge device is updated independently of updating a second edge device. That is, each edge device can have its own neural network model that is updating independently based on factors such as the respective edge device's processing capabilities, and a respective speed at which that edge device can transmit data to a cloud platform for processing.

In some examples, a first transmission time is associated with the first edge device transmitting the data to the cloud computing equipment for processing, a second transmission time is associated with the second edge device transmitting data to the cloud computing equipment for processing, and updating the neural network model is based on the first transmission time and the second transmission time. That is, there can be different transmission latencies between different edge devices and one cloud platform, and this information can be used when edge devices share information to update their respective models.

After operation 506, process flow 500 moves to operation 508.

Operation 508 depicts determining whether to process first data, generated at the first edge device, locally at the first edge device. That is, using system architecture 100 of FIG. 1, edge device 102*a* can use an updated version of model component 108*a* to determine whether input data from data input component 112 is to be processed locally at edge device 102*a* using processing resources 110*a*, or is to be sent to cloud platform 104 for processing with processing resources 110*d*.

In some examples, determining whether to process the first data locally at the first edge device comprises determining not to process the first data locally and determining to transmit the first data to the cloud computing equipment for processing based on the updated neural network model. That is, this determination can be to do one of processing locally and processing in the cloud, but not to both process locally and process in the cloud.

In some examples, a constraint is associated with the first data, and determining whether to process the first data locally is performed based on the constraint. That is, a constraint (such as a SLA) can be used to determine where to process the data—to process the data in a manner that adheres to the constraint.

After operation 508, process flow 500 moves to 510, where process flow 500 ends.

FIG. 6 illustrates another example process flow 600 that can facilitate edge and cloud computing image processing, in accordance with an embodiment of this disclosure. In some examples, one or more embodiments of process flow 600 can be implemented by edge device 102*a* of FIG. 1, or computing environment 1000 of FIG. 10.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 500 of FIG. 5, process flow 700 of FIG. 7, process flow 800 of FIG. 8, and/or process flow 900 of FIG. 9.

Process flow 600 begins with 602, and moves to operation 604. Operation 604 depicts training a neural network model at a first edge device regarding respective amounts of time to process data locally compared to at a cloud computing platform, wherein the data is generated at the first edge device. In some examples, operation 604 can be implemented in a similar manner as operation 504 of FIG. 5.

In some examples, the neural network model is trained based on a service level agreement that indicates an acceptable latency associated with data processing. In some examples, the neural network model is trained based on a first monetary cost associated with the processing of the data being locally, and a second monetary cost associated with transmitting the data to the cloud computing platform for the processing. In some examples, the neural network model is trained based on an amount of network congestion associated with transmitting the data to the cloud computing platform. In some examples, the neural network model is trained based on an amount of available processing resources of the cloud computing platform. That is, constraints can be used to determine where to process data. These constraints can include a SLA, a cost of processing locally and a cost of processing in the cloud, network congestion to the cloud, and the cloud's load.

In some examples, the first edge device is associated with a first speed of processing data, the second edge device is associated with a second speed of processing data, and the first speed of processing data differs from the second speed of processing data. That is, edge devices can have different processing capabilities, and this difference can affect how After operation 604, process flow 600 moves to operation 606.

Operation 606 depicts updating the neural network model resulting in an updated neural network model based on information received from a second edge device regarding a data processing performance of the cloud computing platform. In some examples, operation 606 can be implemented in a similar manner as operation 606 of FIG. 5.

After operation 606, process flow 600 moves to operation 608.

Operation 608 depicts, in response to first data being generated at the first edge device, determining, using the updated neural network model, whether to transmit first data to the cloud computing platform for processing. In some examples, operation 608 can be implemented in a similar manner as operation 508 of FIG. 5.

In some examples, operation 608 comprises determining not to transmit the first data to the cloud computing platform for the processing and determining to process the first data locally at the first edge device. That is, the determination can be made to do one of processing particular data in the cloud or doing that processing locally.

After operation 608, process flow 600 moves to 610, where process flow 600 ends.

FIG. 7 illustrates another example process flow 700 that can facilitate edge and cloud computing image processing, in accordance with an embodiment of this disclosure. In some examples, one or more embodiments of process flow 700 can be implemented by edge device 102*a* of FIG. 1, or computing environment 1000 of FIG. 10.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 500 of FIG. 5, process flow 600 of FIG. 6, process flow 800 of FIG. 8, and/or process flow 900 of FIG. 9.

Process flow 700 begins with 702, and moves to operation 704. Operation 704 depicts training a neural network model at an edge device regarding respective amounts of time to process data locally compared to amounts of time to process the data at network equipment remote from the edge device, wherein the data is generated at the edge device. In some examples, operation 704 can be implemented in a similar manner as operations 504 and 506 of FIG. 5.

In some examples, the edge device is a first edge device, and training the neural network model is performed based on information received from a second edge device regarding a performance of the network equipment in processing the data from the second edge device. That is, multiple edge nodes can share information about cloud performance in processing data, and respective edge devices can use this information to train and/or update their respective model.

In some examples, the neural network model is trained based on a time of day at which the data is processed. That is, a time of day at which processing will occur can be a constraint that is used to determine where to do the processing.

After operation 704, process flow 700 moves to operation 706.

Operation 706 depicts determining whether to process first data, generated at the edge device, locally or to transmit the first data to the network equipment for processing. In some examples, operation 706 can be implemented in a similar manner as operation 508 of FIG. 5.

In some examples, determining whether to process the first data locally or to transmit the first data to the network equipment for processing is performed based on a content of the first data. That is, a routing decision can be made based on contents of data that is to be processed (e.g., a complexity of an image, such as a number of faces to recognize).

After operation 706, process flow 700 moves to 708, where process flow 700 ends.

FIG. 8 illustrates another example process flow 800 for subdividing processing between edge and cloud computing that can facilitate edge and cloud computing image processing, in accordance with an embodiment of this disclosure. In some examples, one or more embodiments of process flow 800 can be implemented by edge device 102*a* of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 500 of FIG. 5, process flow 600 of FIG. 6, process flow 700 of FIG. 7, and/or process flow 900 of FIG. 9.

Process flow 800 begins with 802, and moves to operation 804. In some examples, processing data comprises performing a first operation and a second operation, and determining whether to process data locally at an edge device or in the cloud can be performed as follows. Operation 804 depicts performing the first operation on the first edge device independent of the determining whether to process the first data locally. This can comprise pre-processing of the data that, in some examples, is always performed locally. In a facial recognition example, this pre-processing can comprise locating faces in the image.

In some examples, operation 804 can comprise performing a first operation of the processing on the edge device independent of the determining of whether to process the first data locally or to transmit the first data to network equipment for the processing. After operation 804, process flow 800 moves to operation 806.

Operation 806 depicts determining whether to perform the second operation locally or to transmit the first data to the cloud computing equipment for processing. This can comprise, after pre-processing the data, determining whether to perform additional processing at an edge device or in the cloud.

Using the facial recognition example of operation 804, the first operation can comprise pre-processing by locating faces in an image, and then the second operation can comprise performing facial recognition on these faces that were located in operation 804. That is, in some examples, the first operation comprises identifying, within an image, a presence of facial data indicative of a face, and the second operation comprises performing a facial recognition on the facial data to identify the face.

In some examples, operation 806 can comprise determining whether to perform a second operation of the processing locally or to transmit the first data to the network equipment for the processing.

After operation 806, process flow 800 moves to 808, where process flow 800 ends.

FIG. 9 illustrates another example process flow 900 for training a model that can facilitate edge and cloud computing image processing, in accordance with an embodiment of this disclosure. In some examples, one or more embodiments of process flow 900 can be implemented by edge device 102a of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 500 of FIG. 5, process flow 600 of FIG. 6, process flow 700 of FIG. 7, and/or process flow 800 of FIG. 8.

Process flow 900 begins with 902, and moves to operation 904. In some examples, training a model can comprise executing workloads on an edge by default, and randomly replicating workloads to a cloud (so they are processed in both locations) to produce monitored metrics relating to the processing that can indicate a speed of processing on edge relative to a speed of processing in the cloud. Operation 904 depicts processing a first workload with the edge device to produce first metrics. That is, a workload (e.g., images) can be processed on an edge device that captures that workload.

After operation 904, process flow 900 moves to operation 906.

Operation 906 depicts replicating the first workload from the edge device to the network equipment for processing by the network equipment to produce second metrics. That is, that workload can be copied to a cloud platform for processing in addition to being processed locally in operation 904.

After operation 906, process flow 900 moves to operation 908.

Operation 908 depicts training the neural network model based on the first metrics and the second metrics. That is, information on both processing the workload locally and processing the workload in the cloud can be used to train the local model that determines where to process future workloads.

After operation 908, process flow 900 moves to 910, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of edge device 102a, edge device 102b, edge device 102c, and/or cloud platform 104 of FIG. 1.

In some examples, computing environment 1000 can implement one or more embodiments of the process flows of FIGS. 5-9 to facilitate edge and cloud computing image processing.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, stand-alone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    at least one processor; and
    at least one memory that stores executable instructions that, when executed by the at least one processor, facilitate performance of operations, comprising:
        processing a first workload with a first edge device to produce first metrics;
        replicating the first workload from the first edge device to cloud computing equipment for processing by the cloud computing equipment to produce second metrics, wherein the cloud computing equipment is connected to the first edge device via a communications network;
        training a neural network model at the first edge device regarding respective amounts of time to process data at the first edge device compared to corresponding amounts of time to process the data at the cloud computing equipment, wherein the training is performed based on the first metrics and on the second metrics, and wherein the data is generated at the first edge device;
        updating the neural network model to produce an updated neural network model based on information received from a second edge device regarding a performance of the cloud computing equipment in processing the data, wherein the first edge device and the second edge device having respective different processing capabilities, wherein the neural network model comprises a first neural network model that is trained with a first set of data, wherein the second edge device comprises a second neural network model that is trained with a second set of data, and wherein the first neural network model and the second neural network model differ;
        determining whether to process first data, generated at the first edge device, locally at the first edge device or at the cloud computing equipment; and
        based on the determining, causing the first data to be processed locally at the first edge device or at the cloud computing equipment.

2. The system of claim 1, wherein the determining whether to process the first data locally at the first edge device comprises determining not to process the first data locally and determining to transmit the first data to the cloud computing equipment for processing based on the updated neural network model.

3. The system of claim 1, wherein first edge device is updated independently of updating a second edge device.

4. The system of claim 1, wherein the processing comprises performing a first operation and a second operation, and wherein the determining whether to process the first data locally comprises:
    performing the first operation on the first edge device independent of the determining whether to process the first data locally; and
    determining whether to perform the second operation locally or to transmit the first data to the cloud computing equipment for processing.

5. The system of claim 4, wherein the first operation comprises identifying, within an image, a presence of facial data indicative of a face, and wherein the second operation comprises performing a facial recognition on the facial data to identify the face.

6. The system of claim 1, wherein a first transmission time is associated with the first edge device transmitting the data to the cloud computing equipment for processing, wherein a second transmission time is associated with the second edge device transmitting data to the cloud computing equipment for processing, and wherein the updating of the neural network model is based on the first transmission time and the second transmission time.

7. The system of claim 1, wherein a constraint is associated with the first data, and wherein the determining whether to process the first data locally is performed based on the constraint.

8. A method, comprising:
causing, by a system comprising at least one processor, a first workload to be processed by a first edge device to produce first metrics;
replicating, by the system, the first workload from the first edge device to a cloud computing platform for processing by the cloud computing platform to produce second metrics;
training, by the system, a neural network model at the first edge device regarding respective amounts of time to process data locally compared to at the cloud computing platform, wherein the training is performed based on the first metrics and on the second metrics, and wherein the data is generated at the first edge device;
updating, by the system, the neural network model resulting in an updated neural network model based on information received from a second edge device regarding a data processing performance of the cloud computing platform;
in response to first data being generated at the first edge device, determining, by the system and using the updated neural network model, whether to transmit first data to the cloud computing platform for processing; and
based on the determining, causing, by the system, the first data to be processed locally at the first edge device or at the cloud computing platform.

9. The method of claim 8, wherein the determining whether to transmit the first data to the cloud computing platform for the processing comprises determining not to transmit the first data to the cloud computing platform for the processing and determining to process the first data locally at the first edge device.

10. The method of claim 8, wherein the neural network model is trained based on a service level agreement that indicates an acceptable latency associated with data processing.

11. The method of claim 8, wherein the neural network model is trained based on a first monetary cost associated with the processing of the data being locally, and a second monetary cost associated with transmitting the data to the cloud computing platform for the processing.

12. The method of claim 8, wherein the neural network model is trained based on an amount of network congestion associated with transmitting the data to the cloud computing platform.

13. The method of claim 8, wherein the neural network model is trained based on an amount of available processing resources of the cloud computing platform.

14. The system of claim 1, wherein the first edge device is associated with a first speed of processing data, wherein the second edge device is associated with a second speed of processing data, and wherein the first speed of processing data differs from the second speed of processing data.

15. A non-transitory computer-readable medium comprising instructions that, in response to execution, cause a system comprising at least one processor to perform operations, comprising:
processing a first workload with an edge device to produce first metrics;
replicating the first workload from the edge device to network equipment for processing by the network equipment to produce second metrics;
training a neural network model at the edge device regarding respective amounts of time to process data locally compared to amounts of time to process the data at the network equipment remote from the edge device, wherein the training is performed based on the first metrics and on the second metrics, and wherein the data is generated at the edge device;
determining whether to process first data, generated at the edge device, locally or to transmit the first data to the network equipment for processing; and
based on the determining, causing the first data to be processed locally at the first edge device or at the network equipment.

16. The non-transitory computer-readable medium of claim 15, wherein the edge device is a first edge device, and wherein the training of the neural network model is performed based on information received from a second edge device regarding a performance of the network equipment in processing the data from the second edge device.

17. The non-transitory computer-readable medium of claim 15, wherein the operations further comprise:
performing a first operation of the processing on the edge device independent of the determining of whether to process the first data locally or to transmit the first data to the network equipment for the processing; and
determining whether to perform a second operation of the processing locally or to transmit the first data to the network equipment for the processing.

18. The non-transitory computer-readable medium of claim 15, wherein the determining whether to process the first data locally or to transmit the first data to the network equipment for the processing is performed based on a content of the first data.

19. The non-transitory computer-readable medium of claim 15, wherein the neural network model is trained based on a time of day at which the data is processed.

20. The non-transitory computer-readable medium of claim 15, wherein the determining whether to process the first data locally or to transmit the first data to the network equipment for the processing comprises determining not to process the first data locally and determining to transmit the first data to the cloud computing equipment for processing based on the neural network model.

* * * * *